3,218,325
METHYLATED DERIVATIVES OF YOHIMBANE, PROCESS OF PREPARATION AND PROCESS OF MEDICINAL UTILIZATION
Georges Muller, Nogent sur Marne, André Allais, Paris, and Roland Bardoneschi, Tremblay les Gonesses, France, assignors to Roussel-UCLAF, S.A., Paris, France, a corporation of France
No Drawing. Filed Oct. 14, 1964, Ser. No. 403,941
Claims priority, application France, Mar. 21, 1961, 856,302; June 21, 1961, 865,615
1 Claim. (Cl. 260—287)

This application is a continuation-in-part of our co-pending United States patent application Serial No. 180,862, filed March 19, 1962, now abandoned.

The present invention relates to a new derivative of yohimbane, levorotatory in pyridine, 6,6-dimethyl-16β-carbomethoxy - 17α - methoxy - 18β-(3′,4′,5′-trimethoxybenzoyloxy)-3β,20α-yohimbane of the formula

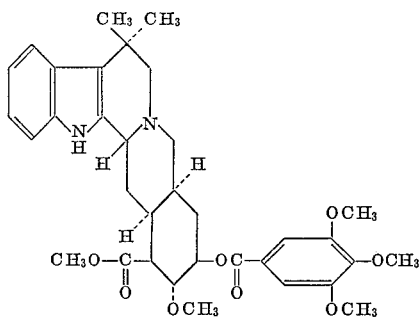

in the form of the free base or pharmacologically acceptable mineral or organic, simple or double acid addition salts, intermediates useful in preparing the same, the process for production of these compounds and the method of utilizing these compounds as a sedative and hypotensive free of adverse side effects.

Reserpine and its analogs such as deserpidine are of known physiological benefit as hypotensors, sedatives and tranquilizers. They have the drawback, however, of causing adverse side effects particularly on long administration and are contra-indicated for patients with peptic ulcers. It has long been an aim of workers in the field to develop a reserpine analog which was as efficacious as reserpine without the well known adverse side effects.

The side effects to reserpine as well as their frequency are reported in the article of A. W. Krogsgaard entitled "Side Effects of Reserpine in the Treatment of Essential Hypertension" (Acta Medica Scandinavica, CLXII, page 465 (1958)).

Side effects: Developed in, percent
Nasal symptoms _____ 41
Dyspnoea _____ 5
Phlebitis _____ 4
Oedemas _____ 4
Diarrhoea _____ 5
Fatigue _____ 35
Dreams _____ 8
Weight gain _____ 35
Mental depression _____ 17

In addition, cases of digestive hemorrhages and gastro duodenal ulcers have been reported by:
M. Levrat and R. Lamvert (Archives des Maladies de l'appareil digestif et des Maladies de la nutrition, 48, 426 (1959)).
W. O. West (5 cases in 42 patients) (Annals of Internal Medicine, 48, 1958).

These authors point out that reserpine exerts an ulcerigenic influence in man which must be feared when the medicament is administered in doses in excess of 2 mg./day.

Deserpidine has similar side effects although the toxicity is somewhat attenuated. According to Merck's Index, 7th edition, 1960, page 203, the dosage range is from 0.1 to 5 mg./day. In the original paper on deserpidine by Schneider et al., J. Pharm. Expt. Therap. 114, 10 (1955) entitled "Pharmacological Studies with Deserpidine, A New Alkaloid from Rauwolfia Canescens," the authors state:

"The pharmacological effects of deserpidine were compared to those of reserpine. No significant differences between the effects of the two alkaloids could be found. This indicates that the methoxy group in ring A of reserpine is not essential for its pharmacological activity."

An object of the present invention is to obtain yohimbane compounds selected from the group consisting of levorotatory in pyridine 6,6-dimethyl-16β-carbomethoxy-17α - methoxy - 18β - (3′,4′,5′-trimethoxybenzoyloxy)-3β, 20α-yohimbane of the formula

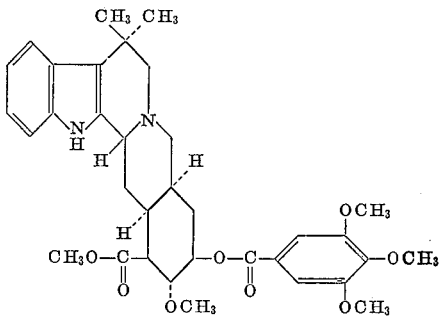

and its pharmacologically acceptable acid addition salts.

Another object of the invention is to develop a process for the production of levorotatory in pyridine 6,6-dimethyl - 16β - carbomethoxy-17α-methoxy-18β-(3′,4′,5′-trimethoxybenzoyloxy)-3β,20α-yohimbane.

A further object of the invention is to obtain intermediates useful in producing levorotatory in pyridine 6,6-dimethyl - 16β-carbomethoxy-17α-methoxy-18β-(3′,4′,5′-trimethoxybenzoyloxy)-3β,20α-yohimbane such as:

6,6-dimethyl-16β-carbomethoxy-17α-methoxy-18β-acetoxy-2,3-3,4-diseco-Δ4(21)-20α-yohimbene-3-oic acid,
6,6-dimethyl-16β-carbomethoxy-17α-methoxy-18β-acetoxy-2,3-3,4-diseco-20α-yohimbane-3-oic acid,
6,6-dimethyl-16β-carbomethoxy-17α-methoxy-18β-acetoxy-2,3-seco-3-oxo-20α-yohimbane,
dextrorotatory in pyridine 6,6-dimethyl-16β-carbomethoxy-17α-methoxy-18β-acetoxy-Δ3(14)-20α-yohimbene,
levorotatory in pyridine 6,6-dimethyl-16β-carbomethoxy-17α-methoxy-18β-acetoxy-3β,20α-yohimbane, 6,6-dimethyl-16β-carbomethoxy-17α-methoxy-18β-acetoxy-3α,20α-yohimbane,
6,6-dimethyl-16β-carbomethoxy-17α-methoxy-18β-hydroxy-3β,20α-yohimbane,
6,6-dimethyl-16β-carbomethoxy-17α-methoxy-18β-hydroxy-3α,20α-yohimbane.

It is a still further object of this invention to provide a method of treating hypertension with a decrease in tendency toward ulcers through the continued dosage of a levorotatory in pyridine 6,6-dimethyl-16β-carbomethoxy-17α - methoxy - 18β - (3',4',5' - trimethoxybenzoyloxy)-3β,20α-yohimbane.

It is another object of this invention to provide a method of tranquilization and sedation with a decrease in tendency toward ulcers through continued dosage of a levorotatory in pyridine 6,6-dimethyl-16β-carbomethoxy-17α - methoxy - 18β - (3',4',5' - trimethoxybenzoyloxy)-3β,20α-yohimbane.

These and other objects of the invention will become more apparent as the description thereof proceeds.

We have found, and this represents our invention, that levorotatory in pyridine 6,6-dimethyl-16β-carbomethoxy-17α - methoxy - 18β - (3',4',5' - trimethoxybenzoyloxy)-3β,20α-yohimbane has a physiological activity similar to reserpine without the commitment adverse side effects. A description of the pharmacodynamical properties will be set forth subsequently.

The process of preparation of the compound and its salts is illustrated by Table I.

TABLE I

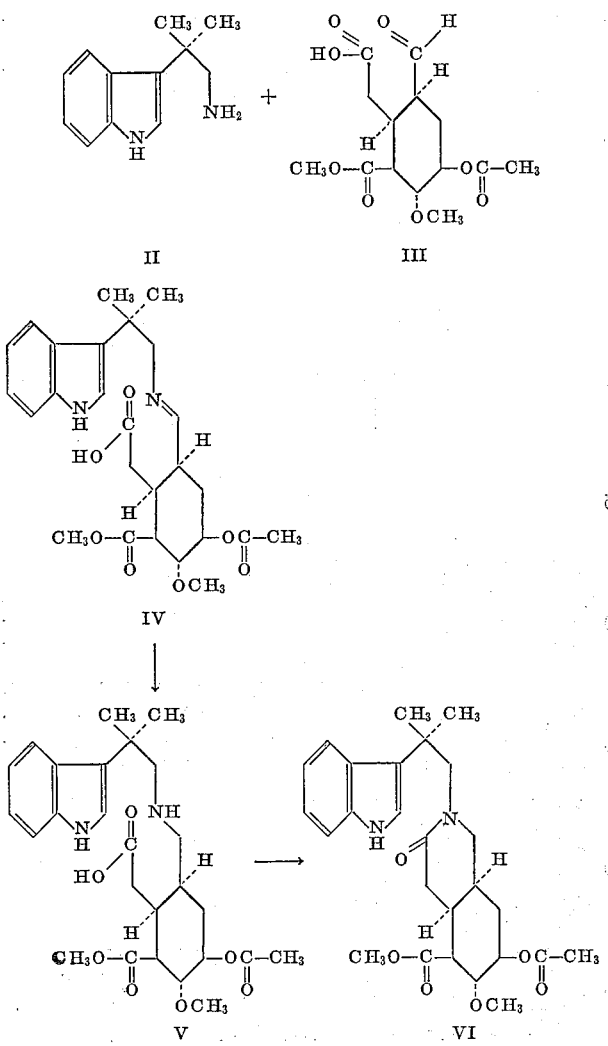

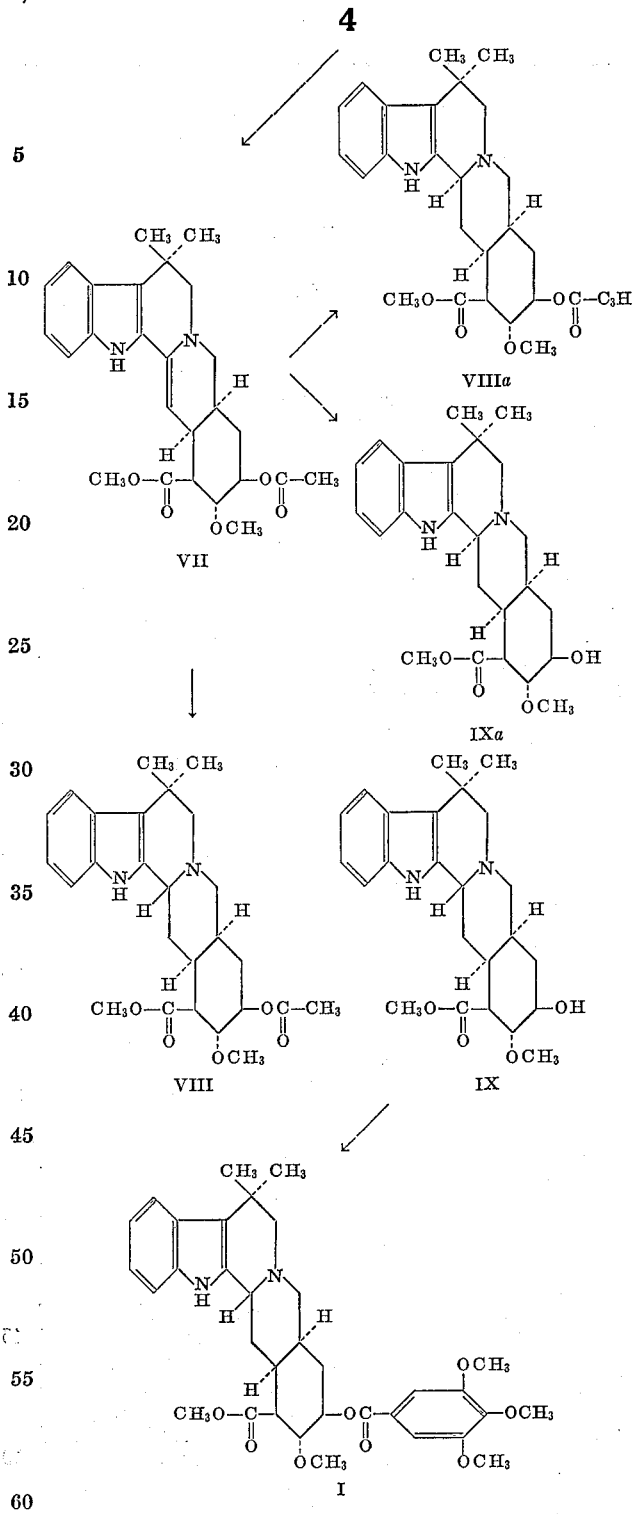

This process is characterized essentially by the condensation of dextrorotatory in pyridine 1β-carboxymethyl-2β-carbomethoxy-3α - methoxy-4β-acetoxy-6β-formylcyclohexane, III, or one of its esters, with β,β-dimethyltryptamine, II. The transformation of the Schiff base so obtained into product of Formula I is made by application of known methods.

According to a preferred method of execution of the invention, dextrorotatory in pyridine 1β-carboxymethyl-2β-carbomethoxy-3α-methoxy-4β - acetoxy-6β-formyl cyclohexane, III, in the form of free acid is condensed with β,β-dimethyl-tryptamine, II, by operating in the presence of dimethylformamide and triethylamine.

The condensation product, the 6,6-dimethyl-16β-carbomethoxy-17α-methoxy - 18β - acetoxy - 2,3-3,4-diseco- Δ$^{4(21)}$-20α-yohimbene-3-oic acid, IV, is converted into levorotatory in pyridine 6,6-dimethyl-16β-carbomethoxy-17α-methoxy-18β - (3′,4′,5′ - trimethoxybenzoyloxy)-3β, 20α-yohimbane, I, by the course of reactions indicated hereafter.

The 6,6-dimethyl-16β-carbomethoxy-17α-methoxy-18β-acetoxy-2,3-3,4 - diseco-Δ$^{4(21)}$-20α-yohimbene-3-oic acid, IV, is reduced by the action of an alkali metal borohydride, such as potassium borohydride, into 6,6-dimethyl-16β-carbomethoxy-17α - methoxy - 18β-acetoxy - 2,3-3,4-diseco-20α-yohimbane-3-oic acid, V. This latter compound is cyclized by heating into 6,6-dimethyl-16β-carbomethoxy-17α-methoxy - 18β - acetoxy - 2,3-seco-3-oxo-20α-yohimbane, VI. Compound VI is further cyclized by action of phosphorus oxychloride into dextrorotatory in pyridine 6,6-dimethyl-16β - carbomethoxy-17α-methoxy-18β-acetoxy-Δ$^{3(14)}$-20α-yohimbene, VII. This latter compound is reduced by means of zinc in the presence of perchloric acid. The levoratatory in pyridine 6,6-dimethyl-16β-carbomethoxy-17α-methoxy - 18β-acetoxy-3β,20α-yohimbane, VIII, is separated from its isomer, the 6,6-dimethyl-16β-carbomethoxy - 17α-methoxy-18β-acetoxy-3α, 20α-yohimbane, VIIIa. This latter compound, VIIIa, may be converted into the desired 3β-isomer by the action of formic acid at elevated temperatures. Next the 3β-isomer (compound VIII) is selectively saponified by the action of potassium borohydride into 6,6-dimethyl-16β-carbomethoxy-17α - methoxy-18β-hydroxy-3β,20α-yohimbane, IX. This compound is esterified by action of 3,4,5-trimethoxybenzoyl chloride and finally the desired levorotatory in pyridine 6,6-dimethyl-16β-carbomethoxy-17α-methoxy - 18β-(3′,4′,5′ - trimethoxybenzoyloxy)-3β, 20α-yohimbane, I, is obtained.

Following the usual operatory methods, the pharmacologically-acceptable acid addition salts of levorotatory in pyridine 6,6-dimethyl-16β-carbomethoxy-17α-methoxy-18β-(3′,4′,5′ - trimethoxybenzoyloxy) - 3β,20α-yohimbane, such as salts of mineral acids of the nature of hydrohalic acids, sulfuric acid, nitric acid, perchloric acid, phosphoric acid; organic acids of the nature of lower alkanoic acids, lower alkanedioic acids, aryl-sulfonic acids, aromatic carboxylic acids and even mono- or polyhydroxylated acids may be formed in the presence or in the absence of a diluent, either directly or by double decomposition.

The following examples serve to illustrate the present invention without, however, limiting the same thereto. More particularly, the conditions and/or the order of the reaction steps may be varied, the nature of the solvents, acids, or bases used may be modified, and other changes and variations may be made by those skilled in the art in accordance with the principles set forth herein and in the claims annexed hereto. Final esterification can also be carried out by following the procedure described by Robert Joly et al., U.S. Patent No. 2,926,167.

EXAMPLE I.—*Preparation of levorotatory in pyridine 6,6-dimethyl-16β - carbomethoxy-17α-methoxy-18β-(3′, 4′,5′-trimethoxy-benzoyloxy)-3β,20α-yohimbane, I*

*Step A: Preparation of 6,6-dimethyl-16β-carbomethoxy-17α-methoxy-18β - acetoxy - 2,3-3,4 - diseco - Δ$^{4(21)}$-20α-yohimbene-3-oic acid, IV.*—2 g. of dextrorotatory in pyridine 1β-carboxy-methyl-2β-carbomethoxy - 3α-methoxy-4β-acetoxy-6β-formylcyclohexane, III, were introduced into 4 cc. of water and 1 cc. of dimethylformamide. The solution was cooled to −10° C. and slowly, under agitation, 1.1 cc. of triethylamine was added. The solution was allowed to stand under agitation at −10° C. for a period of about 12 minutes. Then the solution of 1 g. of β,β-dimethyl-tryptamine, II, in 1 cc. of dimethylformamide and 0.5 cc. of water was added. The reaction mixture was maintained under agitation at −10° C. for a period of about 15 minutes. The resultant solution of 6,6-dimethyl-16β-carbomethoxy-17α-methoxy-18β-acetoxy-2,3-3,4-diseco-Δ$^{4(21)}$-20α-yohimbene-3-oic acid, IV, was used as such for the following steps of the synthesis.

This compound is not described in the literature.

β,β-Dimethyl-tryptamine, II, was prepared following the process described in the French Patent No. 1,296,586.

Compound III is obtained according to the process described in U.S. Patent No. 2,952,682.

*Step B: Preparation of 6,6-dimethyl-16β-carbomethoxy-17α-methoxy-18β-acetoxy - 2,3-3,4-diseco-20-yohimbane-3-oic acid, V.*—Following the method of operation described in U.S. Patent No. 2,988,552, Example 3, the solution of compound IV, obtained according to Step A, was reduced and a solution of 6,6-dimethyl-16β-carbomethoxy-17α-methoxy-18β-acetoxy - 2,3-3,4-diseco-20α-yohimbane-3-oic acid, V, was obtained which was utilized for the following step.

This compound is not described in the literature.

*Step C: Preparation of 6,6-dimethyl-16β-carbomethoxy-17α-methoxy-18β-acetoxy-2,3 - seco-3-oxo-20α-yohimbane, VI.*—Following the method of operation described in U.S. Patent No. 2,988,552, Example 4, the solution of compound V, obtained in the preceding step, was subjected to heating and raw 6,6 - dimethyl - 16β - carbomethoxy-17α-methoxy-18β - acetoxy-2,3-seco-3-oxo-20α-yohimbane, VI, was obtained which was used as such for the next step.

This compound is not described in the literature.

*Step D: Preparation of dextrorotatory in pyridine 6,6-dimethyl-16β-carbomethoxy-17α-methoxy - 18β - acetoxy-Δ$^{3(14)}$ - 20α - yohimbene, VII.*—Following the method of operation described in U.S. Patent No. 2,907,769, Example 11, the C ring of compound VI, obtained according to Step C, is cyclized and 4.2 g. of dextrorotatory in pyridine, 6,6-dimethyl-16β-carbomethoxy - 17α - methoxy-18β-acetoxy-Δ$^{3(14)}$-20α - yohimbene, VII, having a melting point of about 190-195° C. and a specific rotation [α]$_D^{20}$=+120° ±5° (c.=0.5% in pyridine), were obtained.

The compound was soluble in acetone and chloroform, slightly soluble in alcohol, very slightly soluble in ether.

*Analysis.*—$C_{26}H_{32}O_6N_2$; molecular weight=452.53. Calculated: C, 69.00%; H, 7.13%; N, 6.19%. Found: C, 68.9%; H, 7.1%; N, 6.3%.

This compound is not described in the literature.

*Step E: Preparation of levorotatary in pyridine 6,6-dimethyl-16β-carbomethoxy-17α - methoxy - 18β - acetoxy-3β,20α-yohimbane, VIII.*—Following the method of operation described in U.S. Patent No. 2,907,769, Example 12(b), 6.5 g. of compound VII, obtained according to the preceding step, were reduced and 950 mg. of levorotatory in pyridine, 6,6-dimethyl-16β-carbomethoxy - 17α-methoxy-18β-acetoxy-3β, 20α-yohimbane. VIII, were obtained having a melting point of 261° C. and a specific rotation [α]$_D^{20}$=−89° ±5° (C.=0.5% in pyridine).

The product was soluble in chloroform, slightly soluble in alcohol and acetone.

This compound is not described in the literature.

In the course of the execution of the process, there was also formed the 3α-isomer of compound VIII, that is to say, 6,6-dimethyl-16β-carbomethoxy-17α - methoxy-18β-acetoxy-3α,20α-yohimbane, VIIIa, which was separated from its isomer by chromatography over alumina. The 3α-isomer has a melting point of about 195° C.

It was soluble in alcohol, ether, acetone and chloroform.

This compound is not described in the literature.

In addition, there was also isolated from the reaction mixture, 6,6-dimethyl-16β-carbomethoxy - 17α - methoxy-18β-hydroxy-3α,20α-yohimbane, IXa, having a melting point of 284° C.

This product was soluble in acetone and chloroform, slightly soluble in alcohol, insoluble in ether.

*Analysis.*—$C_{24}H_{32}O_4N_2$; molecular weight=412.51. Calculated: C, 69.88%; H, 7.82%. Found: C, 69.75%; H, 7.7%.

This compound is not described in the literature.

Either of these two 3α-isomers can be transformed into the corresponding 3β-isomer by treating them with refluxing formic acid.

*Step F: Preparation of 6,6-dimethyl-16β-carbomethoxy-17α-methoxy - 18β - hydroxy - 3β,20 - yohimbane, IX.*—Following the method of operation described in U.S. Patent No. 2,907,769, Example 13, 0.5 g. of compound VIII, obtained according to the preceding step, were selectively saponified and 400 mg. of raw 6,6-dimethyl-16β-carbomethoxy-17α - methoxy-18β - hydroxy - 3β,20α- yohimbane, IX, were obtained which were used as such for the next step of the synthesis.

This compound is not described in the literature.

*Step G: Preparation of levorotatory in pyridine 6,6-dimethyl-16β-carbomethoxy-17α - methoxy - 18β - (3',4',5'-trimethoxy-benzoyloxy)-3β,20α - yohimbane, I.*—Following the method of operation described in U.S. Patent No. 2,907,769, Example 14, 0.4 g. of compound IX, obtained according to Step F, were esterified and 0.2 g. of levorotatory in pyridine 6,6-dimethyl-16β - carbomethoxy - 17α-methoxy-18β-(3',4',5',-trimethoxy-benzoyloxy) - 3β,20α-yohimbane, I, were obtained having a melting point of 200° and 245° C., and a specific rotation $[\alpha]_D^{20} = -164° \pm 10°$ (c.=0.25% in pyridine).

This product was soluble in acetone and chloroform, slightly soluble in alcohol and ether.

*Analysis.*—$C_{34}H_{42}O_8N_2$; molecular weight=606.69. Calculated: C, 67.31%; H, 6.98%; N, 4.62%. Found: C, 67.2%; H, 7.2%; N, 4.9%.

This compound is not described in the literature.

The product, compound I, possesses interesting pharmacological properties. It possesses particularly a neuro-sedative action. This depressive action on the central nervous system is equal in intensity to that of reserpine and its analogs, but without the troublesome secondary effects of diarrhea, profound adynamia, and stomach ulcers provoked by these compounds. Compound I possesses also an anti-hypertensive action at least equal to that of reserpine. It can be used for the treatment of disturbances of comportment due to anxiety psychosis, to hyperemotivity, to spasms, and to hyperexcitation. Because of its anti-hypertensive action, it is best utilized in order to eliminate nervous troubles in hypertensive people. In addition it can be used in geriatrics for patients in the states of permanent irritability, in the states of excitability due to a premenstrual or menopausic syndrome, and in the phenomena of insomnia by reenforcing the action of barbiturates.

Compound I, 6,6-dimethyl deserpidine, is particularly useful for the treatment of mild neurosis, mild psychic disorders or mild behavioral problems which do not require hospitalization. Compound I, because of its less prolonged effect, does not provoke prostration and allows ambulatory treatment without secondary inconveniences.

Levorotatory in pyridine 6,6-dimethyl - 16β - carbomethoxy-17α-methoxy-18β-(3',4',5' - trimethoxybenzoyloxy)-3β,20α-yohimbane is utilized by oral, transcutaneous or rectal methods.

It can be prepared in the form of injectable solutions or injectable suspensions, prepared in ampules, in multiple dose flacons, in the form of tablets and in the form of suppositories.

The useful dosology is controlled between 1 and 10 mg. per dose and 5 and 50 mg. per day in the warm-blooded animal as a function of the method of administration.

The pharmaceutical forms such as injectable solutes or suspensions, tablets and suppositories are prepared according to the usual process.

*Example II.*—(1) *Pharmacological study of levorotatory in pyridine 6,6 - dimethyl-16β-carbomethoxy-17α-methoxy - 18β - (3',4',5'-trimethoxybenzoyloxy) - 3β,20α-yohimbane (6,6-dimethyl deserpidine)*

(a) DETERMINATION OF THE NEURO-DEPRESSOR EFFECT

*Test of ptosis of the eyelids in rats.*—The research on the neuro-depressive effect was made on the rat by means of the test of the ptosis of the eyelids such as described and codified by Rubin et al., J. Pharm. Exp. Therap. 1957, 120, 125.

The product was injected intraperitoneally in lots of 5 rats and readings were made each hour for a period of 6 hours after the injections, and then on the next day.

The table below gives the observed results:

TABLE II

| Doses, γ/kg. | Degree of Ptosis | | |
|---|---|---|---|
| | 5 hours after injection | 6 hours after injection | 24 hours after injection |
| 75 | 3 | 4 | 0 |
| 100 | 7 | 9 | 1 |
| 200 | 20 | 24 | 19 |
| 500 | 31 | 32 | 22 | according to the graphic method of Tainter and Miller. The 50% effective dose, $ED_{50}$, is equal to 205 γ/kg. ±50γ.

Comparatively, the $ED_{50}$ of reserpine and deserpidine are as follows:

Reserpine about 200 γ/kg.
Deserpidine about 250 γ/kg.

The product exercises thus according to this test a neuro-depressive power equal to that of reserpine. It is to be remarked, however, that the effect of reserpine at low dosages exhausts itself generally in 24 hours in the doses utilized or at least the effect is considerably diminished. By contrast, the action of 6,6-dimethyl-16β-carbomethoxy-17α - methoxy - 18β - (3',4',5' - trimethoxybenzoyloxy)-3β,20α-yohimbane has only been moderately weakened. However at high dosages, the effect of reserpine persists for a longer period of time than that of 6,6-dimethyl-16β-carbomethoxy-17α-methoxy - 18β - (3',4',5' - trimethoxybenzoyloxy)-3β,20α-yohimbane.

*Test of the turning cylinder.*—In this test the neuro-depressive effect is estimated by the number of falls of mice placed in lots of 5 on a horizontal cylinder in rotation about its axis. Normal mice hold their equilibrium by displacing themselves in an inverse sense to that of the movement of the cylinder. The speed of rotation is chosen such that the number of falls per animal does not exceed 4 during a test of four minutes. The retardation of the position reflexes augments the number of falls in a fashion sensibly proportional to the amount of the active substance injected. This gives a numerical value of the intensity of action of the compound injected.

The mice are subjected to the test one hour, four hours, one day, two days, three days, and four days after the injection. There was injected in each lot of mice 1, 2, 5, 10 and 20 mg./kg. doses of 6,6-dimethyl-16β-carbomethoxy-17α-methoxy - 18β - (3',4',5' - trimethoxybenzoyloxy)-3β,20α-yohimbane by intraperitoneal injection.

TABLE III.—TURNING CYLINDER TEST

| Doses | Number of Falls | | | | | |
|---|---|---|---|---|---|---|
| | One Hour | Four Hours | One Day | Two Days | Three Days | Four Days |
| 1 mg./kg.—D | 3 | 6.5 | 7 | 1 | 1 | 0 |
| 1 mg./kg.—R | 1 | 5 | 1 | 0 | 1 | 0 |
| 2 mg./kg.—D | 14.2 | 15 | 14 | 11 | 6 | 0 |
| 2 mg./kg.—R | 11 | 15 | 13 | 7 | 0.5 | 0 |
| 5 mg./kg.—D | 21 | 20 | 21 | 10 | 1 | 0 |
| 5 mg./kg.—R | 17 | 21 | 19 | 11 | 8 | 6 |
| 10 mg./kg.—D | 21 | 21 | 26.5 | 19 | 3 | 0 |
| 10 mg./kg.—R | 21 | 19 | 21 | 16 | 13 | 11 |
| 20 mg./kg.—D | 20.2 | 25 | 28 | 19 | 7 | 1 |
| 20 mg./kg.—R | 22.5 | 22 | 21.5 | 17 | 15 | 13 |

D represents 6,6-dimethyl-16β-carbomethoxy-17α-methoxy-18-β(3′, 4′, 5′-trimethoxybenzoyloxy)-3β,20α-yohimbane.
R represents reserpine.

As is shown in Table III, the said compound exercises a total effect similar to that of reserpine. However, two important differences are observed:

(1) The maximum neuro-depressor effect of 6,6-dimethyl - 16β - carbomethoxy - 17α - methoxy - 18β - (3′,-4′,5′-trimethoxybenzoyloxy)-3β,20α-yohimbane is obtained 24 hours after the injections, whereas the effect of reserpine attains its maximum in about 4 hours.

(2) The effect of the reserpine as measured according to this test which utilizes much larger doses than those utilized in the test of ptosis of the eyelids, is exhausted after 24 hours in a dose of 1 mg./kg., the effect of which is very weak. In larger doses of reserpine the return to normal is effected progressively and very slowly. Very important residual effects are noted three and four days after the administration of 2, 5, 10 and 20 mg./kg. This residual effect is all the more marked when the dosage is more elevated. Under the same conditions, 6,6-dimethyl - 16β - carbomethoxy - 17α - methoxy - 18β - (3′,-4′,5′-trimethoxybenzoyloxy)-3β,20α-yohimbane does not provoke the residual effect. On the contrary, the return to normal is more rapid than with reserpine and the effects observed the third and fourth day are nil or negligible.

These results show that the neuro-depressor power of 6,6-dimethyl-16β-carbomethoxy - 17α - methoxy-18β-(3′, 4′,5′-trimethoxybenzoyloxy)-3β,20α-yohimbane is almost equal to that of reserpine the day of the treatment, a little superior the next day and again almost equal the second day. It is, in contrast to reserpine, very inferior the third and fourth days.

In the results observed, where the residual effects of reserpine continue three or four days after injection of elevated doses, the important factor to consider is the safety of the dosage rather than the pharmacodynamic effect. Here one should understand the important advantage had by 6,6-dimethyl - 16β - carbomethoxy-17α-methoxy - 18β - (3′,4′,5′-trimethoxybenzoyloxy) - 3β,20α-yohimbane from the point of view of safety.

(b) DETERMINATION OF THE ANTI-HYPERTENSIVE EFFECT

The injection by intraperitoneal methods of 6,6-dimethyl-16β-carbomethoxy - 17α - methoxy - 18β - (3′,4′,5′-trimethoxybenzoyloxy)-3β,20α-yohimbane in a dose of 100 γ/kg. to rats rendered artificially hypertensive by administration of desoxycorticosterone acetate and ingestion of salt water (see Green, Ann. Internal. Med. 1953, 39, 333, and Peterfalvi et al. Arch. Intern. Pharmacodynamie, 1960, 124, 237) brings a noticeable lowering of the arterial pressure.

As is shown in Table IV, the injection of 6,6-dimethyl-16 β-carbomethoxy-17α-methoxy-18β-(3′,4′,5′-trimethoxybenzoyloxy-3β,20α-yohimbane causes the restoration of the arterial pressure, which in hypertensive rats had attained a value of about 19 cm. of mercury, to the neighborhood of its normal value, which is about 12 cc. of mercury.

TABLE IV

| Dose | Arterial Pressure | | Lowering in percent | Lowering in percent Average per dose |
|---|---|---|---|---|
| | Initial | At the maximum of effect | | |
| 100 γ/kg | 19 | 14.6 | 23 | 22.5 |
| | 18 | 14 | 22 | |
| 200 γ/kg | 18 | 12.6 | 30 | 34 |
| | 17 | 11 | 35 | |
| | 18 | 11.3 | 37 | |

Comparatively, 100 γ/kg. of reserpine cause an average lowering in percent of 23.2% and 200 γ/kg. of reserpine cause an average lowering in percent of 32.7%. Similarly, deserpidine causes an average decrease in percent of 22% at 100 γ/kg. and 32% at 200 γ/kg. Under the conditions of this test, an average lowering of the artificially induced hypertension of 32–34% to the normal pressure is the maximum attainable.

The anti-hypertensive effect of 6,6-dimethyl-16β-carbomethoxy - 17α - methoxy-18β-(3′,4′,5′-trimethoxybenzoyloxy)-3β,20α-yohimbane is similar to that observed for reserpine and deserpidine under the same conditions.

(2) Determination of the toxicity (a) ACUTE TOXICITY

The test of acute toxicity was effected on mice of the Rockland strain weighing from 20 to 22 g. 6,6-dimethyl-16β - carbomethoxy-17α-methoxy-18β-(3′,4′,5′-trimethoxybenzoyloxy)-3β,20α-yohimbane, dissolved in an aqueous solvent, was injected to lots of ten mice by intraperitoneal methods, in doses of 1, 2, 5, 10 and 20 mg./kg., respectively. The animals were held under observation for a period of five days. A neurodepressive symptomatology typical of reserpine was observed. No mortality was noted during the period of observation in any of the doses injected. The 50% lethal dose, $DL_{50}$, is thus greater than 20 mg./kg.

(b) CHRONIC TOXICITY

Lots of five male rats received daily, except Sunday, doses of 50γ to 1 mg./kg. of 6,6-dimethyl-16β-carbomethoxy-17α-methoxy-18β-(3′,4′,5′ - trimethoxybenzoyloxy)-3β,20α-yohimbane by subcutaneous methods. Each rat had thus received a total of nine injections during a period of 10 days. The animals were weighed every other day. Their consumption of food was determined each day. The state of sedation was evaluated every day by a reading of the ptosis of the eyelids made before the injection of that day. At the end of the test the animals were autopsied. The ulcers of the stomach were determined and noted; and the thymus, testicles, the seminal vesicules and the prostate were weighed.

Similar tests were parallelly made with reserpine. One identical lot of untreated animals served as a control lot.

The 50% effective dose, as concerning the neurosedative effect (evaluated by the degree of ptosis of the eyelids) in this semi-chronic test, was found identical for the compound studied and for reserpine. It was 500 γ/kg.

At the end of the treatment, there was noted for the stronger dose of 1 mg./kg. of 6,6-dimethyl-16β-carbomethoxy-17α-methoxy - 18β - (3′,4′,5′-trimethoxybenzoyloxy)-3β,20α-yohimbane:

(1) A slight slackening of growth with reference to the controls, but a gain in weight with reference to the initial weight (whereas with reserpine, the weight dropped about 35%).

(2) A very slight drop of consumption of food, as compared with the controls, whereas this decreased considerably for the lot treated with reserpine.

(3) A zero mortality, whereas the lot treated with reserpine had a mortality of 40%.

(4) An absence of stomach ulcers, whereas the lot treated with reserpine showed stomach ulcers in all of the rats.

(5) A slight lowering of weight of the thymus in a ratio with the slackening of growth rate, whereas with the lot treated with reserpine there was an actual disintegration of thymus.

(6) No modification of the weight of the testicles, whereas the weight of the testicles of rats treated with reserpine decreased almost 27%.

(7) No modification of the weight of the prostate, whereas on the rats treated with reserpine, the weight of the prostate decreased more than 80%.

(8) No modification of the weight of the seminal vesicles, whereas on the rats treated with reserpine a loss of weight of 80% was observed.

The dose of 1 mg./kg. of 6,6-dimethyl-16β-carbomethoxy - 17α - methoxy-18β-(3′,4′,5′-trimethoxybenzoyloxy)-3β,20α-yohimbane per day was well tolerated. The 50% lethal dose of this compound by standard acute toxicity tests on mice is greater than 20 mg./kg. The maximum tolerated daily dose without undesirable effects was 50 to 100 γ/kg. for reserpine.

This test of chronic toxicity demonstrates that 6,6-dimethyl - 16β - carbomethoxy - 17α-methoxy-18β-(3′,4′,5′,-trimethoxybenzoyoxy)3β,20α-yohimbane has a neurodepressor effect analogous to that of reserpine and an almost total absence of secondary toxic effects.

The above examples are illustrative of the invention without, however, limiting the same, and enable those skilled in the art to understand the invention. It is obvious that other expedients may be employed without departing from the spirit of the invention or the scope of the appended claim.

We claim:

A yohimbane compound selected from the group consisting of levorotatory in pyridine 6,6-dimethyl-16β-carbomethoxy - 17α - methoxy-18β-(3′,4′,5′-trimethoxybenzoyloxy)- 3β,20α-yohimbane of the formula

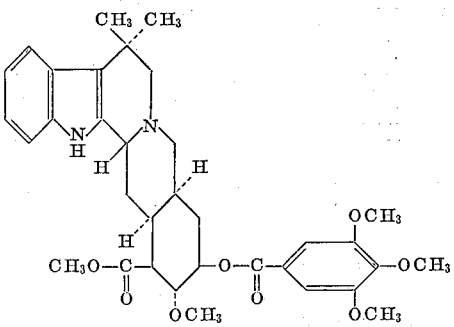

and its pharmacologically-acceptable acid addition salts.

References Cited by the Examiner

UNITED STATES PATENTS

| | | | |
|---|---|---|---|
| 2,786,843 | 3/1957 | Huebner | 260—287 |
| 2,788,309 | 4/1957 | Cooper | 167—67 |
| 3,031,453 | 4/1962 | Lucas | 260—287 |
| 3,048,592 | 8/1962 | Muller et al. | 260—287 |

WALTER A. MODANCE, *Primary Examiner.*